United States Patent
Betran Palomas

(10) Patent No.: US 9,803,619 B2
(45) Date of Patent: Oct. 31, 2017

(54) WIND TURBINE BLADE AND METHOD OF CONTROLLING THE LIFT OF SUCH A BLADE

(71) Applicant: ALSTOM RENEWABLE TECHNOLOGIES, Grenoble (FR)

(72) Inventor: Jaume Betran Palomas, Sant Cugat Del Vallès (ES)

(73) Assignee: ALSTOM Renewable Technologies, Grenoble (FR)

( * ) Notice: Subject to any disclaimer, the term of this patent is extended or adjusted under 35 U.S.C. 154(b) by 576 days.

(21) Appl. No.: 14/377,496

(22) PCT Filed: Feb. 19, 2013

(86) PCT No.: PCT/EP2013/053236
§ 371 (c)(1),
(2) Date: Aug. 7, 2014

(87) PCT Pub. No.: WO2013/124253
PCT Pub. Date: Aug. 29, 2013

(65) Prior Publication Data
US 2015/0192106 A1     Jul. 9, 2015

Related U.S. Application Data

(60) Provisional application No. 61/636,454, filed on Apr. 20, 2012.

(30) Foreign Application Priority Data

Feb. 20, 2012   (EP) ..................... 12382055

(51) Int. Cl.
*F03D 7/02*     (2006.01)
*F03D 1/06*     (2006.01)

(52) U.S. Cl.
CPC .......... *F03D 7/022* (2013.01); *F03D 1/0641* (2013.01); *F03D 1/0675* (2013.01);
(Continued)

(58) Field of Classification Search
CPC ...... F03D 7/022; F03D 7/0236; F03D 7/0232; F03D 1/0641; F03D 1/0683
See application file for complete search history.

(56) References Cited

U.S. PATENT DOCUMENTS 2,886,264 A    5/1959  Seager
5,938,404 A    8/1999  Domzalski et al.
(Continued)

FOREIGN PATENT DOCUMENTS

CN    101387264 A    3/2009
DE    2908761 A1     9/1980
(Continued)

OTHER PUBLICATIONS

Unofficial English Translation of Chinese Office Action issued in connection with corresponding CN Application No. 201380008235.9 dated Sep. 9, 2016.
(Continued)

*Primary Examiner* — Gregory Anderson
*Assistant Examiner* — Juan G Flores
(74) *Attorney, Agent, or Firm* — Dority & Manning, P.A.

(57) ABSTRACT

Wind turbine blade comprising a shape modifiable airfoil section that extends both chordwise and spanwise and has a not modified default shape, a conduit that extends from the inside of the blade towards the outside of the blade, and an outer part comprising a flow regulator that is located at the shape modifiable airfoil section and blocks the conduit when the shape modifiable airfoil section presents its default shape, and does not block the conduit when the shape modifiable airfoil section presents a modified shape. In the latter situation the conduit is opened to the outside of the blade and a device for exchanging a fluid between the inside and the outside of the blade is thus defined.

16 Claims, 3 Drawing Sheets

(52) U.S. Cl.
CPC ..... *F05B 2240/31* (2013.01); *F05B 2240/311* (2013.01); *Y02E 10/721* (2013.01); *Y02E 10/723* (2013.01)

(56) References Cited

U.S. PATENT DOCUMENTS

| | | |
|---|---|---|
| 5,957,413 A | 9/1999 | Glezer et al. |
| 7,632,068 B2 | 12/2009 | Bak et al. |
| 2009/0074573 A1 | 3/2009 | Rebsdorf et al. |
| 2010/0104436 A1 | 4/2010 | Herr et al. |

FOREIGN PATENT DOCUMENTS

| | | | |
|---|---|---|---|
| DK | WO 2010133591 A1 * | 11/2010 | ........... F03D 1/0641 |
| EP | 1674723 | 6/2006 | |
| EP | 2153059 | 11/2008 | |
| WO | WO2008/132235 | 11/2008 | |
| WO | WO 2009/025548 | 2/2009 | |
| WO | WO 2011/026495 | 3/2011 | |

OTHER PUBLICATIONS

International Search Report and Written Opinion for PCT/EP/2013/053236, dated Mar. 12, 2013, 9 pgs.

\* cited by examiner

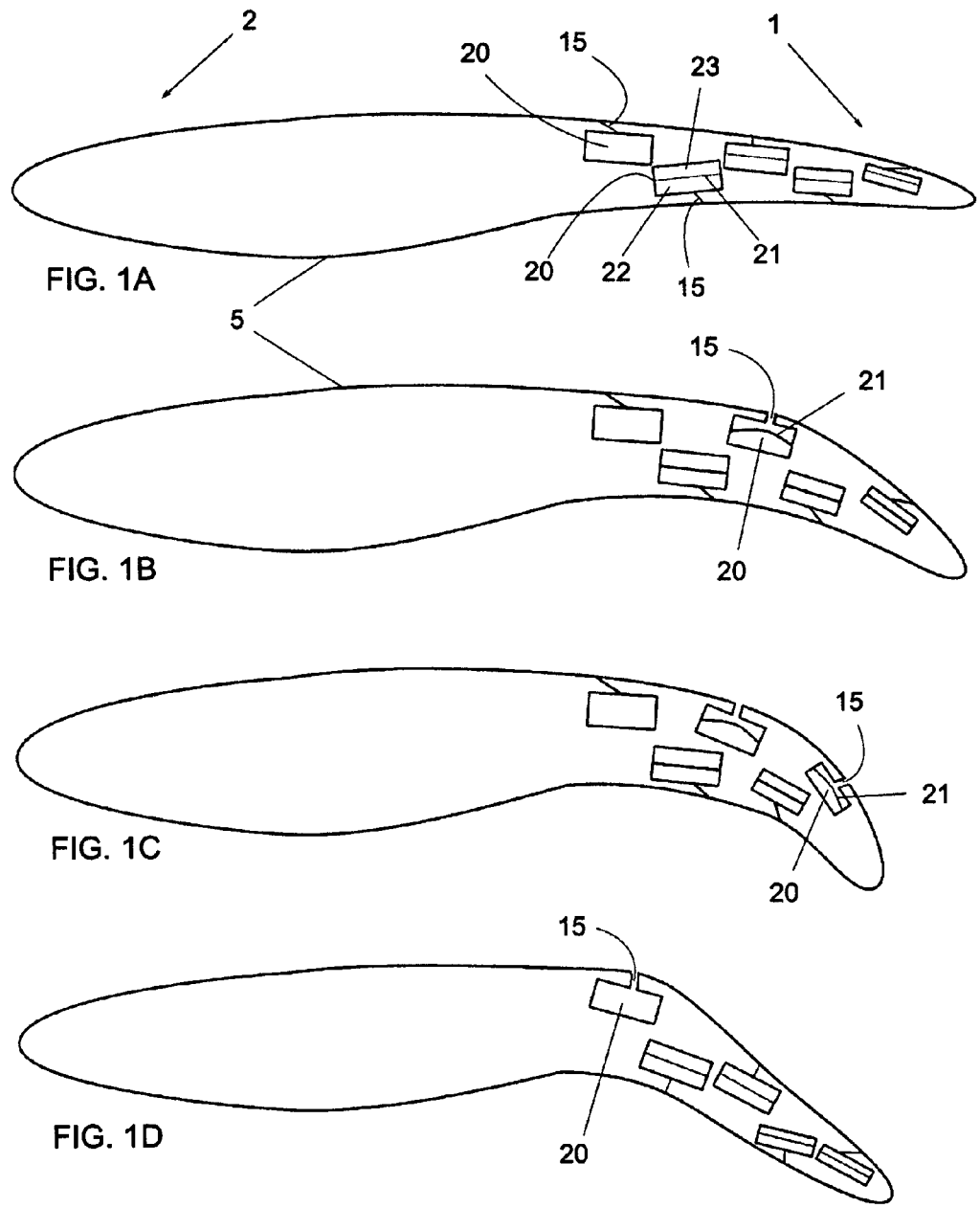

WIND TURBINE BLADE AND METHOD OF CONTROLLING THE LIFT OF SUCH A BLADE

This application claims the benefit of European Patent Application No. 12382055.7 filed on Feb. 20, 2012, and U.S. Provisional Patent Application Ser. No. 61/636,454 filed on Apr. 20, 2012.

The present invention is related to an aerodynamic blade for use in a wind turbine, comprising a shape modifiable airfoil section that extends both chordwise and spanwise and has a not modified default shape, and a conduit that extends from the inside of the blade towards the outside of the blade. The invention is also related to a method of controlling the lift of such a blade.

'Chordwise' means extending along a chord of the blade (i.e., transversally) and 'spanwise' means extending along the span of the blade (i.e., longitudinally).

The default shape (i.e. not modified) of the shape modifiable airfoil section is the shape said airfoil section adopts when it is in a relaxed state, i.e. not deflected or deformed (in the rest of the application the term 'deformed' is to be understood as equivalent to 'shape modified'). The shape modifiable airfoil section may be the trailing edge section, the leading edge section, or a section therebetween. In this context a section means a region of the blade that extends both chordwise and spanwise and may comprise a portion of the pressure side or the suction side or of both sides of the blade.

BACKGROUND ART

It is possible to regulate the loads acting on the blades of a wind turbine by modifying the airfoil shape of the blade, particularly at the trailing edge section thereof. EP2153059 discloses a wind turbine blade "having a suction side and a pressure side, which sides are connected at a leading edge and a trailing edge, wherein one or more shape modifiable airfoil sections are defined in the area of the trailing edge of the blade, and wherein said one or more shape modifiable airfoil sections are attached to a blade body, each of the one or more modifiable airfoil sections having an upper skin and a lower skin, a first one of the upper and lower skin being secured to the blade body, and a second one of the upper and lower skin being slidably movable with respect to the blade body, so that a force applied to one of said skins cause said second skin to slide with respect to the blade body, so as to thereby modify the airfoil shape of the trailing edge."

Such a shape modifiable trailing edge section increases the lift of the blade, but a lift increase can lead to boundary layer separation (or, in general, flow separation) from the aerodynamic surface of the blade (airfoil), which in turn decreases the lift, thus reducing the initial effect.

WO2011026495 discloses a wind turbine blade comprising: "a flap for modifying the aerodynamic surface of the rotor blade; a chamber disposed in the rotor blade and configured such that movement of the flap causes a property change in the chamber, the property change being a change of air pressure within the chamber and/or a change of the volume of air in the chamber; a nozzle disposed on the aerodynamic surface of the rotor blade and in fluid communication with the chamber; wherein the chamber and the first nozzle are configured such that the property change in the chamber generates an air mass flow through the nozzle."

In the embodiment of FIG. 3 the flap 15 is formed from an elastomeric material and is "a solid member attached to the blade body 17 which is caused to deflect by an actuator (...) Embedded in the flap 15 are two reservoirs 30 and 31. Upper reservoir 30 is situated near the suction surface 22 and lower reservoir 31 is situated near the pressure surface 23. When the flap 15 deflects, the shape of the reservoirs 30 and 31 also change since they are formed as chambers in the elastomeric material; this in turn causes the volume of each reservoir 30 and 31 to change such that they will either expel air or suck in air. Upper reservoir 30 is attached to a nozzle 34 via means of a conduit 33 and the nozzle 34 is located on the pressure surface 23. Lower reservoir 31 is attached to a nozzle 36 via means of a conduit 35 and the nozzle 36 is located on the suction surface 22. When the flap 15 deflects downwards towards the pressure side 23, lower reservoir 31 is compressed forcing air to be expelled through nozzle 36 which will help the boundary layer to stay attached and prevent or delay separation of the boundary layer. At the same time, upper reservoir 30 will expand which will suck air through nozzle 34 and into the upper reservoir 30, and this suction on the pressure surface will help the boundary layer to stay attached to the airfoil profile."

But said nozzles on the aerodynamic surface of the blade can create unwanted boundary layer perturbations too.

SUMMARY OF THE INVENTION

It is an object of the present invention to provide a shape modifiable wind turbine blade that avoids unwanted boundary layer perturbations or, at any rate, counter-balances said perturbations.

According to a first aspect of the invention, the wind turbine blade comprises a shape modifiable airfoil section, a conduit that extends from the inside towards the outside of the blade, and an outer part comprising a flow regulator that is located at the shape modifiable airfoil section and is suitable to block the conduit when the shape modifiable airfoil section presents the default shape, and is suitable not to block the conduit when the shape modifiable airfoil section presents a modified shape thus allowing the conduit to reach the outside of the blade. In this way, the outer end area of the conduit is closed at the surface region of the blade and there is no disturbance or perturbation (or counter-perturbation) on the blade surface when the shape modifiable airfoil section is in the relaxed state, i.e., when there is no need of any boundary layer control; and the conduit is opened to the outside of the blade and defines a device for exchanging a fluid (e.g. air) between the inside and the outside of the blade when the shape modifiable airfoil section presents a modified shape. Therefore, the boundary layer is actively controlled only when the shape modifiable airfoil section is deformed, which is when such active control is most needed.

Therefore the conduit can connect the inside of the blade to the outside thereof, depending on the state of deformation of the blade. The conduit may be any kind of passageway.

The flow regulator may regulate the aperture of the outer end of the conduit by means of a valve, the term 'valve' intended to embrace any element that, by its movement, can open or close a fluid passage. The movement of the outer part can actuate the flow regulator to open or close the conduit, normally the outer end thereof.

The outer part may comprise a portion made of a deformable material in order to be able to be continuously deformed. The deformable material may be an elastomer.

In some embodiments the blade comprises a plurality of outer parts distributed in a scattered fashion over the blade, for example like tiles covering either some portions or the whole of the shape modifiable airfoil section or of the blade.

In some embodiments the conduit extends from one spot of the blade surface to another spot of the blade surface, one of said spots not being necessarily located in the shape modifiable airfoil section, i.e., the conduit may start at the shape modifiable airfoil section and may end at a different section of the blade, or viceversa.

The outer end of the conduit may be at the suction side of the blade or at the pressure side of the blade, since, depending on the deformation of the shape modifiable airfoil section, flow separation can occur at both sides.

The incidence angle of the conduit at its outer end may be substantially perpendicular or may be slanted with respect to the surface of the blade thereat, so that the air-exchanging device is able to act in different ways.

The blade may comprise a plurality of conduits distributed along a substantially longitudinal slot which is substantially closed by the outer part when the shape modifiable airfoil section presents the default shape and is not closed by the outer part when the shape modifiable airfoil section presents a modified shape. In this way the boundary layer control can be enhanced.

In some embodiments, both the slots and the outer ends of conduits starting (or ending) therein are distributed in a scattered fashion (spanwise or chordwise), so that the curvature of the airfoil when the shape modifiable airfoil section is deformed naturally contributes to let one or more conduits opened to the outside.

The blade may comprise a chamber located inside the blade and connected to the conduit at the inner end thereof. Said chamber may be provided with a membrane able to vibrate when actuated; in particular, the assembly of the chamber, the membrane and the conduit can form a synthetic jet. The membrane may be substantially parallel or may be substantially perpendicular or may be tilted relative to the surface of the blade at the outer end of the conduit, depending on the intended effect.

There may be more than one conduit extending from the chamber to different locations at the surface of the blade.

The wind turbine blade may comprise more than one chamber and corresponding conduit or conduits.

In some embodiments the shape modifiable airfoil section is located within the third of the chord of the blade corresponding to the trailing edge, said trailing edge section being the most commonly deformed portion of the blade.

In some embodiments the shape modifiable airfoil section is located within the third of the chord of the blade corresponding to the leading edge, since sometimes it is interesting to deform the leading edge section too.

A wind turbine may comprise a blade as the one defined in the preceding paragraphs.

According to a second aspect of the invention, a method of controlling the lift of a blade of a wind turbine comprises the use of a blade as the one defined in the preceding paragraphs.

Such a method may comprise the step of modifying the shape of the shape modifiable airfoil section.

The method may also comprise the step of opening at least one conduit in response to the modification of the shape of the shape modifiable airfoil section.

BRIEF DESCRIPTION OF THE DRAWINGS

Some particular embodiments of the present invention will be described in the following, only by way of non-limiting example, with reference to the appended drawings, in which:

FIG. 1 schematically shows the cross-section shape of a blade (i.e. the airfoil) with different deformations of the trailing edge section thereof;

DESCRIPTION OF PARTICULAR EMBODIMENTS

Figure 2A:
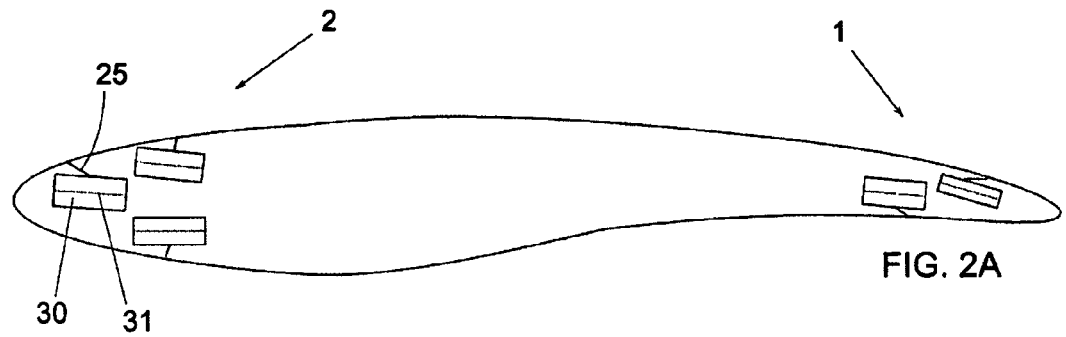
FIG. 2 schematically shows a deformation of the leading edge section.

In the embodiment shown in FIG. 1 only the trailing edge section 1 of the blade is provided with some air-exchanging devices. Any such device comprises a chamber 20 located inside the blade and a conduit 15 that can connect said chamber with the outside of the blade; the inner end of the conduit 15 opens to the chamber 20 and the outer end of the conduit 15 almost reaches the blade surface 5 (the conduit actually reaches the outer surface when it is opened). The chamber 20 can be provided with a membrane 21 which divides the chamber in two regions, an outer region 22 connected to the conduit 15 and an inner region 23, thus forming, together with the conduit 15, a synthetic jet.

FIG. 1A shows the blade in a relaxed state, i.e. not deformed. In this situation, one or more deformable outer parts (not shown), that may be a skin of the blade or some outer elements thereof (like a plurality of tiles), block the outer end of every conduit 15, effectively closing them, and there is no air-exchange between any chamber 20 and the outside of the blade.

FIG. 1B shows the blade with a deformed trailing edge section 1. This deformation causes the outer parts to unblock the outer end of at least one conduit 15, effectively opening it, so that there can be an air-exchange between the chamber 20 and the outside of the blade in order to thwart the risk of flow separation at that area of the blade. If the chamber 20 comprises a membrane 21 (as in FIG. 1B), said membrane can be actuated to enhance the air-exchange; for example, the membrane can be made to oscillate by means of a piezoelectric actuator (not shown), for example at a high frequency.

In general, the conduits 20 are opened in the areas of the blade where the curvature of the airfoil is highest, or at least above a certain level, which can be different from one area to another. The outer parts act like valve means than open and close the outer ends of the conduits. For example, some outer parts may be like a lid covering, and uncovering, the outer end of the conduits, in which case the outer part is itself a valve, or the valve means may be a narrow perforation in a deformable outer part, said perforation being closed when the outer part is in a relaxed condition and being opened when the outer part undergoes a certain deformation.

FIG. 1C shows the blade with a further deformation in the trailing edge section 1, said further deformation causing the aperture of a further conduit 15 that is located nearer to the trailing edge than the previously opened conduit (FIG. 1B), and FIG. 1D shows a different deformation, this time causing the aperture of a conduit 15 that is farther from the trailing edge than the previously opened conduit (FIG. 1B). Note that the opened conduit 15 shown in FIG. 1D is the only one that is opened, meaning that the curvature of the airfoil is highest where the outer end of said conduit is located and is not quite enough to require flow control elsewhere.

Also note that the chamber 20 which is shown connected to the outside of the blade in FIG. 1D is not provided with any membrane, the air-exchange thus being less intense than in the previous situations. This depends on the particular situation but in principle it does not depend on the chamber being nearer to or farther from the trailing edge.

In the embodiment shown in FIG. 2 both the trailing edge section 1 and the leading edge section 2 are provided with synthetic jets, each of the latter comprising a conduit 25 and a chamber 30 provided with a membrane 31, analogously to the previous embodiment, although some chambers 30 might again not comprise any membrane.

Figure 2B:
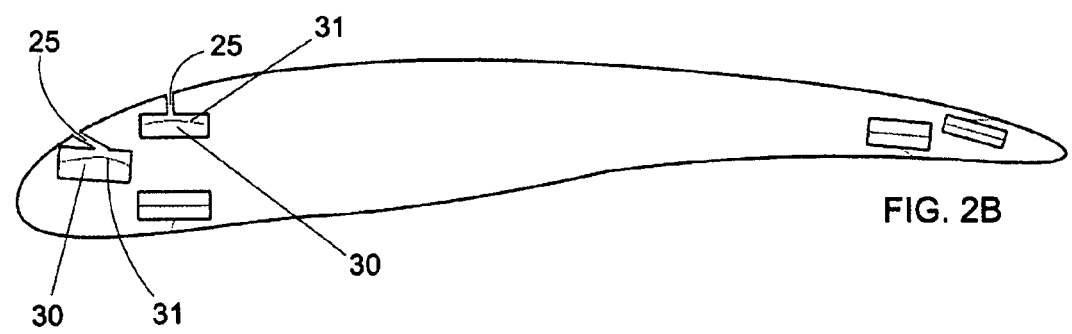

FIG. 2A shows the blade in a relaxed state, with all the conduits 25 blocked by the outer parts, and FIG. 2B shows the blade with the leading edge section 2 deformed, so that some conduits 15 are opened and there can be an air-exchange between one or more chambers 30 and the outside of the blade.

FIG. 3 shows an embodiment that is not provided with any chamber and in which a conduit 35 and a conduit 36 meet inside the blade through a membrane 41. Said membrane can be actuated just like in the synthetic jets described above.

Figure 3A:
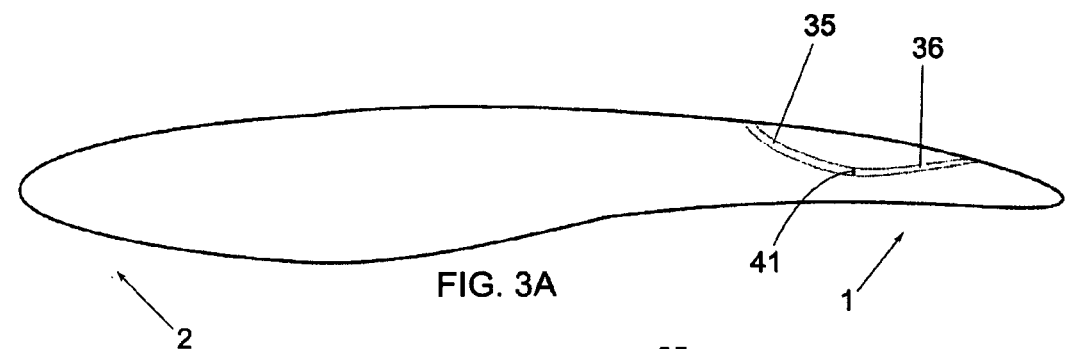
FIG. 3 schematically shows a different conduit configuration.
Figure 3B:
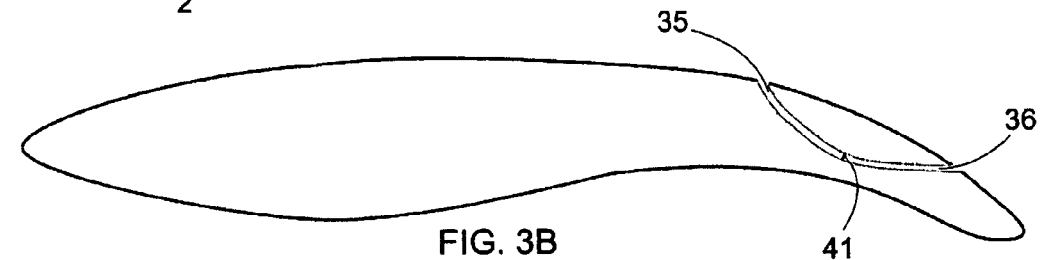

FIG. 3A shows the blade in a relaxed state, with the conduits 35 and 36 blocked by the outer parts, and FIG. 3B shows the blade with the trailing edge section deformed and the conduits 35 and 35 opened to the outside.

Alternatively, the conduits 35 and 36 can be connected without any membrane between them, so that the air-exchange between is just naturally established between the outer end area of the conduit 35 and the outer end area of the conduit 36.

Another alternative to the embodiment of FIG. 3 is a chamber provided between the conduits 35 and 36 and comprising a membrane similar to the membrane 41.

Figure 4:
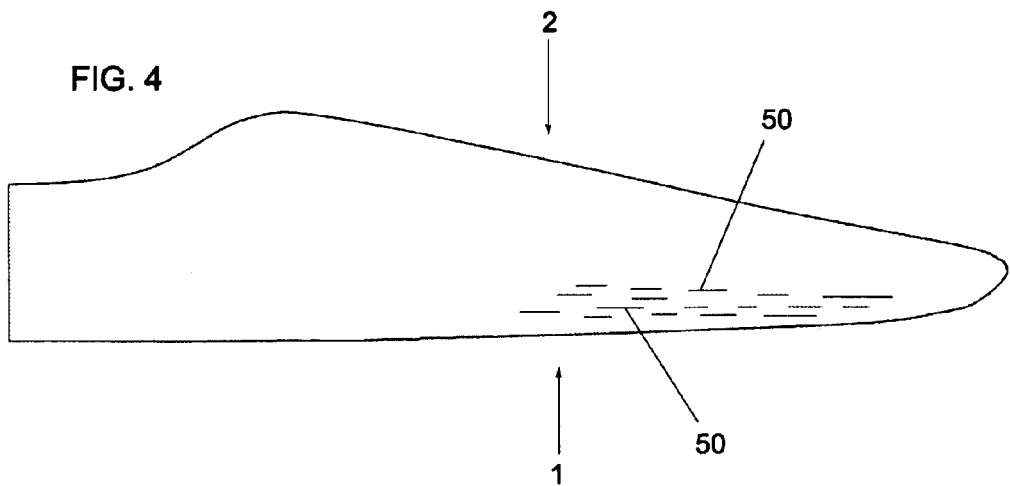
FIG. 4 schematically shows a longitudinal view of a blade provided with some slots on its surface.
Figure 5:
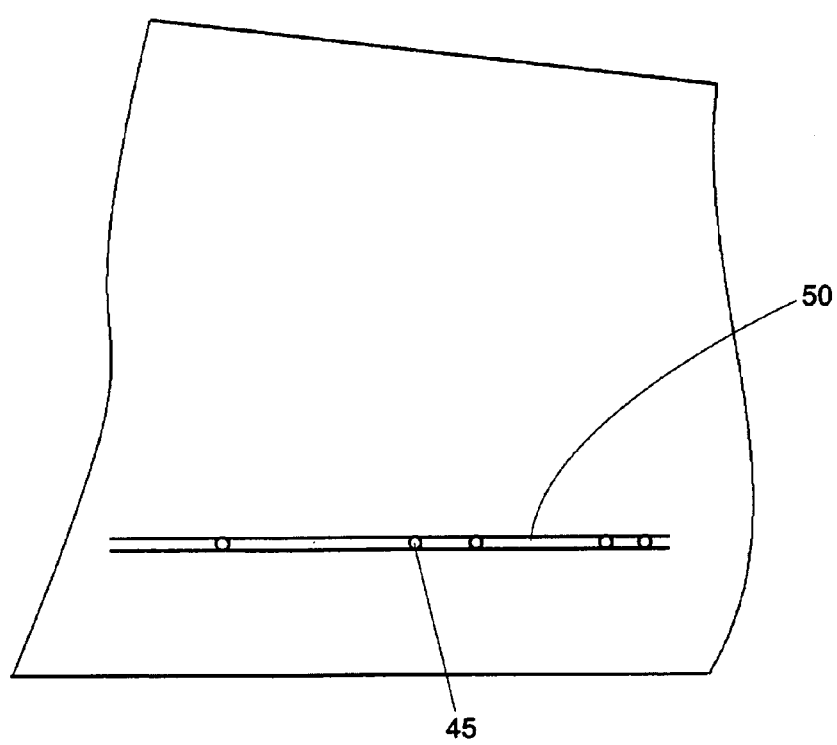
FIG. 5 schematically shows some conduits reaching one of said slots.

FIG. 4 shows a blade having a trailing edge section 1 and a leading edge section 2 and comprising a plurality of longitudinal slots 50 on its surface, either on the suction side or the pressure side or on both. As shown in FIG. 5, which is an enlarged view of a portion of FIG. 4, the outer ends of some conduits 45 reach said slots, i.e., they are opened to the outside through the slots 50. In this case, depending on the curvature of the airfoil along a slot 50, the outer parts will block or unblock it, thus closing or opening the conduits 45.

As shown in FIGS. 4 and 5, the slots 50 can be distributed in a scattered fashion on the blade and the outer ends of the conduits 45 can be scattered along any such slot.

Although only particular embodiments of the invention have been shown and described in the present specification, the skilled man will be able to introduce modifications and substitute any technical features thereof with others that are technically equivalent, depending on the particular requirements of each case, without departing from the scope of protection defined by the appended claims.

For example, the drawings show only conduits opened to the suction side of the blade, but, depending on the circumstances, there can also be conduits opened to the pressure side of the blade.

Or the described embodiments can be combined in any suitable way.

Also, the slots 50 can have a direction other than the longitudinal one.

The invention claimed is:

1. A wind turbine blade comprising:
    a shape modifiable airfoil section that extends both chordwise and spanwise and has an undeformed default shape,
    a conduit that extends from an inside of the blade to an outside surface of the blade, and
    an outer part of the conduit comprising a flow regulator located at the shape modifiable airfoil section, the flow regulator blocking the conduit when the shape modifiable airfoil section presents the default shape, and
    in a deformed shape, the shape modifiable airfoil section comprising an increased curvature that causes the flow regulator to move and unblock the conduit, thereby allowing an air exchange between the inside and the outside of the blade.

2. The wind turbine blade according to claim 1, wherein the outer part comprises a portion made of a deformable material.

3. The wind turbine blade according to claim 1, further comprising a plurality of outer parts distributed in a scattered fashion over the blade.

4. The wind turbine blade according to claim 1, wherein the conduit extends from a first outside surface of the blade to a second outside surface of the blade.

5. The wind turbine blade according to claim 4, wherein the second outside surface of the blade is located outside of the shape modifiable airfoil section.

6. The wind turbine blade according to claim 1, further comprising a plurality of conduits distributed along a substantially longitudinal slot which is closed by the outer part when the shape modifiable airfoil section presents the default shape and is not closed by the outer part when the shape modifiable airfoil section presents the deformed shape.

7. The wind turbine blade according to claim 6, wherein the plurality of conduits are distributed in a scattered fashion.

8. The wind turbine blade according to claim 6, further comprising a plurality of slots which are spanwise distributed in a scattered fashion.

9. The wind turbine blade according to claim 6, further comprising a plurality of slots which are chordwise distributed in a scattered fashion.

10. The wind turbine blade according to claim 1, further comprising a chamber located at the inside of the blade and connected to the conduit.

11. The wind turbine blade according to claim 10, further comprising more than one conduit extending from the chamber to different locations at the surface of the blade.

12. The wind turbine blade according to claim 1, wherein the shape modifiable airfoil section is located within a third of the chord of the blade corresponding to a trailing edge.

13. The wind turbine blade according to claim 1, wherein the shape modifiable airfoil section is located within a third of the chord of the blade corresponding to a leading edge.

14. A wind turbine comprising a blade according to claim 1.

15. A wind turbine blade comprising:
    a shape modifiable airfoil section that extends both chordwise and spanwise and has an undeformed default shape,
    a conduit that extends from an inside of the blade to an outside surface of the blade, and
    an outer part of the conduit comprising a flow regulator located at the shape modifiable airfoil section, the flow regulator being suited to block the conduit when the shape modifiable airfoil section presents the default shape, and not suited to block the conduit when the shape modifiable airfoil section presents a deformed shape, thereby allowing an air exchange between the inside and the outside of the blade;

a chamber located at the inside of the blade and connected to the conduit; and wherein the chamber is provided with a membrane suited to vibrate when actuated by the air exchange.

16. The wind turbine blade according to claim 15, wherein the chamber, the membrane and the conduit form a synthetic jet.

\* \* \* \* \*